United States Patent
Fettes (10) Patent No.: US 12,419,288 B1
(45) Date of Patent: Sep. 23, 2025

(54) ADJUSTABLE FISHING ROD BUTT AND REEL SEAT, AND FISHING ROD EMPLOYING SAME

(71) Applicant: AFTCO MFG. CO., INC., Santa Ana, CA (US)

(72) Inventor: Ian Fettes, June Lake, CA (US)

(73) Assignee: AFTCO MFG. CO., INC., Santa Ana, CA (US)

( * ) Notice: Subject to any disclaimer, the term of this patent is extended or adjusted under 35 U.S.C. 154(b) by 0 days.

(21) Appl. No.: 18/789,547

(22) Filed: Jul. 30, 2024

(51) Int. Cl.
 A01K 87/06 (2006.01)
 A01K 87/02 (2006.01)

(52) U.S. Cl.
 CPC .............. *A01K 87/06* (2013.01); *A01K 87/02* (2013.01)

(58) Field of Classification Search
 CPC ................................. A01K 87/02; A01K 87/06
 See application file for complete search history.

(56) References Cited

U.S. PATENT DOCUMENTS

| | | | | |
|---|---|---|---|---|
| 2,000,263 | A * | 5/1935 | Teetor | A01K 87/06 43/23 |
| 5,276,991 | A * | 1/1994 | Stotesbury | A01K 87/04 43/24 |
| D495,025 | S | 8/2004 | Malcarne | |
| D497,404 | S | 10/2004 | Malcarne | |
| D536,414 | S | 2/2007 | Malcarne | |
| 7,454,862 | B2 | 11/2008 | Markley et al. | |
| D638,093 | S | 5/2011 | Malcarne | |
| D638,509 | S | 5/2011 | Malcarne | |
| D676,107 | S | 2/2013 | Malcarne | |
| 8,413,366 | B2 | 4/2013 | Malcarne | |
| 8,919,031 | B2 | 12/2014 | Malcarne | |
| D877,854 | S | 3/2020 | Malcarne | |
| 10,757,926 | B2 | 9/2020 | Malcarne | |
| 11,051,500 | B2 | 7/2021 | Malcarne | |
| 12,052,980 | B1 * | 8/2024 | Stirling | A01K 87/02 |
| 2006/0230669 | A1 | 10/2006 | Markley et al. | |
| 2010/0251596 | A1 * | 10/2010 | Malcarne | A01K 87/02 43/18.1 CT |
| 2014/0259862 | A1 * | 9/2014 | Malcarne | A01K 87/08 43/4.5 |
| 2020/0344987 | A1 * | 11/2020 | Malcarne | A01K 87/06 |
| 2021/0282382 | A1 | 9/2021 | Malcarne | |

FOREIGN PATENT DOCUMENTS

JP 2012249527 12/2012

* cited by examiner

*Primary Examiner* — Christopher D Hutchens
(74) *Attorney, Agent, or Firm* — Larry K. Roberts (57) ABSTRACT

The present application is directed to a combination butt and reel seat device for a fishing rod which is adjustable between a linear configuration and one or more curved or angled configurations. An exemplary embodiment of the device includes a butt section including a first hinge structure and a rod butt connector structure. The device includes a reel seat section including a second hinge structure and a reel seat connector structure. A lockable hinge is configured to allow relative rotation of the butt section and reel seat section, with a lock mechanism to lock the butt section and reel seat section in a plurality of angular positions.

16 Claims, 10 Drawing Sheets

ADJUSTABLE FISHING ROD BUTT AND REEL SEAT, AND FISHING ROD EMPLOYING SAME

BACKGROUND OF THE INVENTION

Off-shore fishing for tuna and other game species requires fishing tackle which can handle the forces required to play and land powerful fish species. The fishing rod system typically includes a rod blank with line guides, a reel seat and a rod butt. Offshore trolling rods for deep sea fishing and surf casting rods are often formed of three main sections—the rod itself, the rear butt section which provides a long handle and a firm, solid support for the rod assembly, and a reel seat section between the butt and the rod. The rearmost end of the butt section of the trolling rod may be provided with a gimbal knock in the form of a transversely notched end to support the rod in a given position of alignment with respect to a rod gimbal.

Large bending forces are applied to the rod assembly, being applied to the butt by the great leverage of the rod itself. Thus offshore trolling rods and surf casting rods are most likely to break, under long use and great bending stresses, at the junction of the reel seat and the butt section.

U.S. Pat. No. 4,083,141, the entire contents of which are incorporated herein by this reference, describes an integral butt and rod seat for an offshore trolling rod.

The applicant has for many years marketed a product known as the "Unibutt" combination handle-reel seat for trolling rods. The Unibutt product is marketed in linear as well as angled versions, to suit the angler's preference. However, it would be an advantage to have a reel rod butt and reel seat whose angular orientation can be adjusted to different positions.

DETAILED DESCRIPTION

In the following detailed description and in the several figures of the drawing, like elements are identified with like reference numerals. The figures may not be to scale, and relative feature sizes may be exaggerated for illustrative purposes.

The present application is directed to a combination rod butt and reel seat device for a fishing rod which is adjustable between a linear configuration and one or more curved or angled configurations. An exemplary embodiment of the adjustable butt and reel seat device includes a butt section including a first hinge structure and a rod butt connector structure. The device includes a reel seat section including a second hinge structure and a reel seat connector structure. A lockable hinge is configured to allow relative rotation of the butt section relative to the reel seat section, with a lock mechanism to lock the butt section and reel seat section in a plurality of angular positions.

In an exemplary embodiment, the lockable hinge includes the first and second hinge structures, configured to fit together such that respective first and second facing surfaces of the hinge structure are in facing relationship. A hinge fastener pin passes through respective openings formed in the respective first and second hinge structures, defining a hinge axis transverse to the fishing rod length.

A receiver structure is defined by or mounted in a selected one of the first hinge structure or the second hinge structure, the receiver structure defining a plurality of spaced openings arranged on an arc concentric with the hinge axis.

A pawl structure is arranged to fit within a slot formed in the other of the first and second hinge structures and is mounted for rotational movement on a pawl axis. The pawl structure includes a key opening and a pawl extending from a distal end of the pawl structure. The pawl is arranged to fit into any one of the plurality of openings to lock the hinge in a corresponding rotational position relative to the hinge axis.

A spring-biased lever member is mounted to the other of the first and second hinge structures and includes an elongated lever and a transverse connector end at an end of the elongated lever and arranged to be received in the key opening of the pawl structure. The lever member is configured for rotational movement about the transverse connector end and has a home position in which the pawl structure is positioned with the pawl in the selected one of the plurality of openings, and an unlock position in which the pawl structure is rotated to a position in which the pawl is out of engagement with any of the plurality of openings, allowing rotational movement of the hinge structure. The lever member is biased by a spring to the home position.

Figure 1:
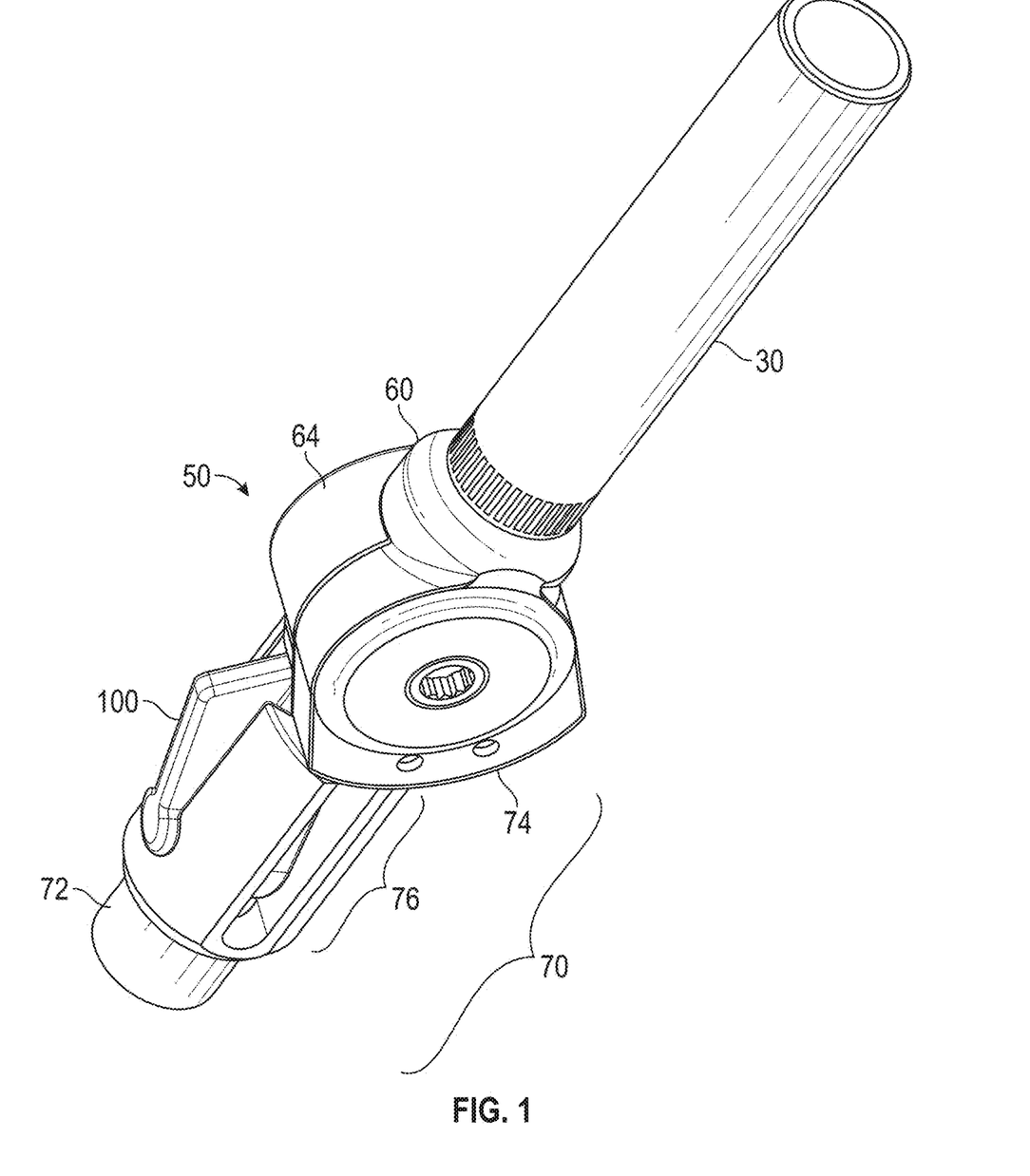
FIG. 1 is an isometric view of an exemplary embodiment of a combination rod butt and reel seat device for a fishing rod which is adjustable between a linear configuration and one or more curved or angled configurations.
Figure 2:
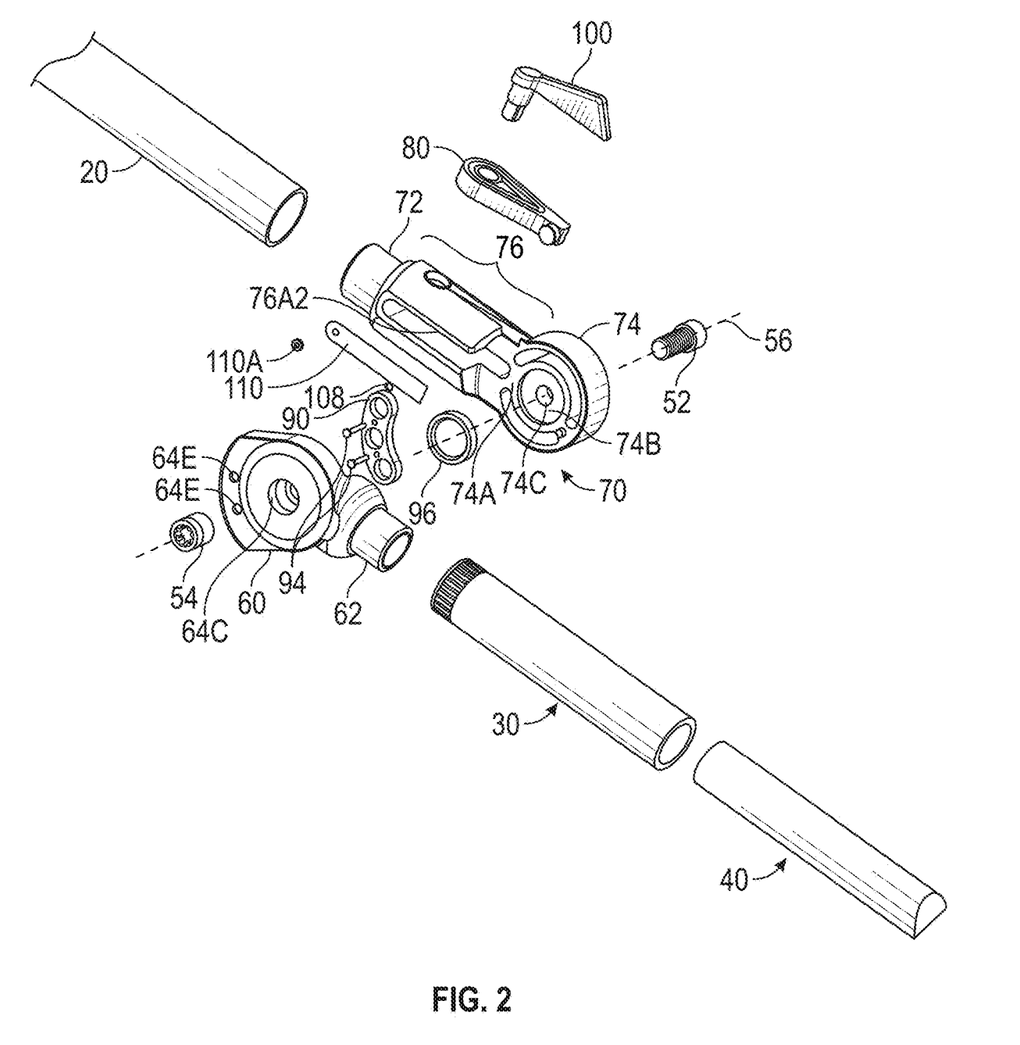
FIG. 2 is an isometric exploded view of the device of FIG. 1.
Figure 3A:
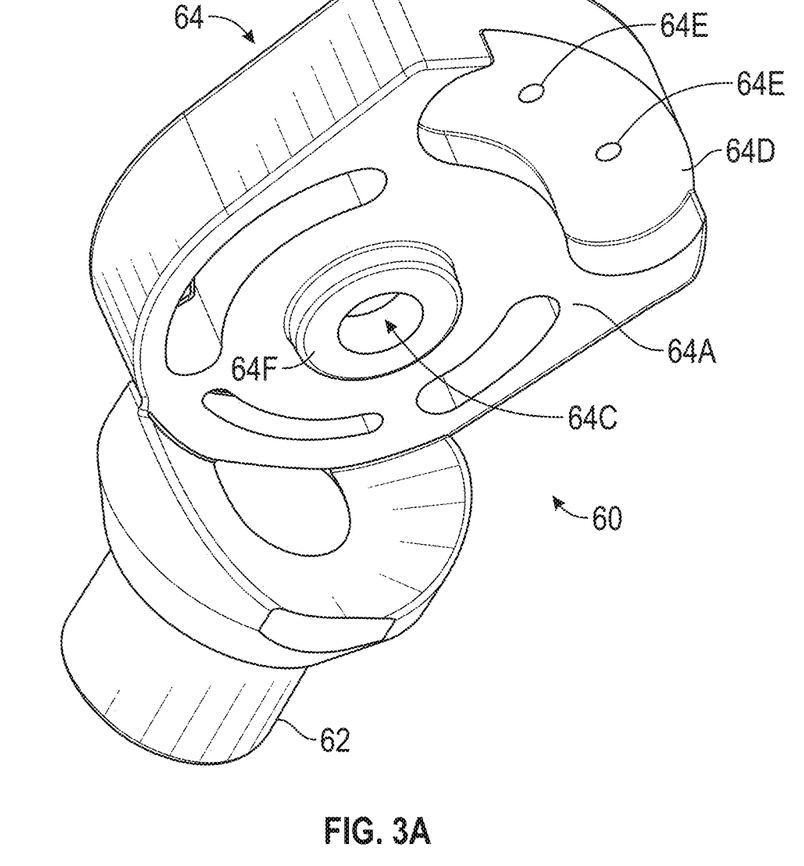
FIG. 3A is an isometric view of an exemplary embodiment of a reel seat structure of the device of FIG. 1.
Figure 3B:
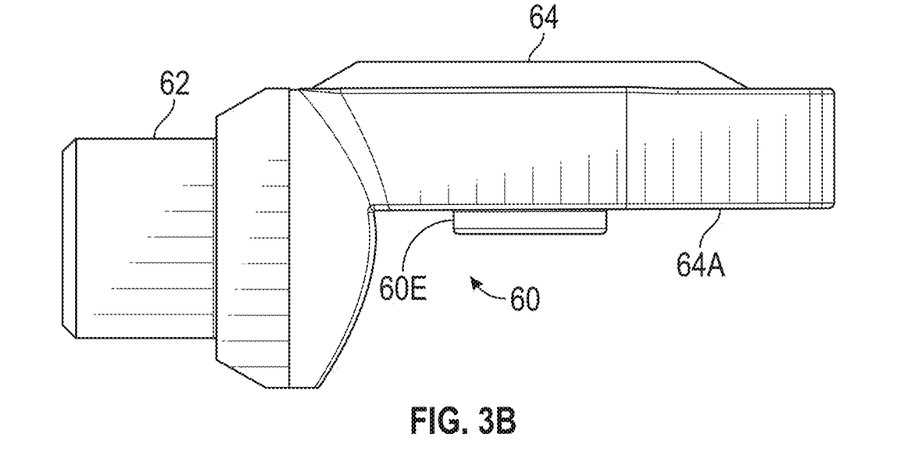
FIG. 3B is a side view of the reel seat structure of FIG. 3A.
Figure 3C:
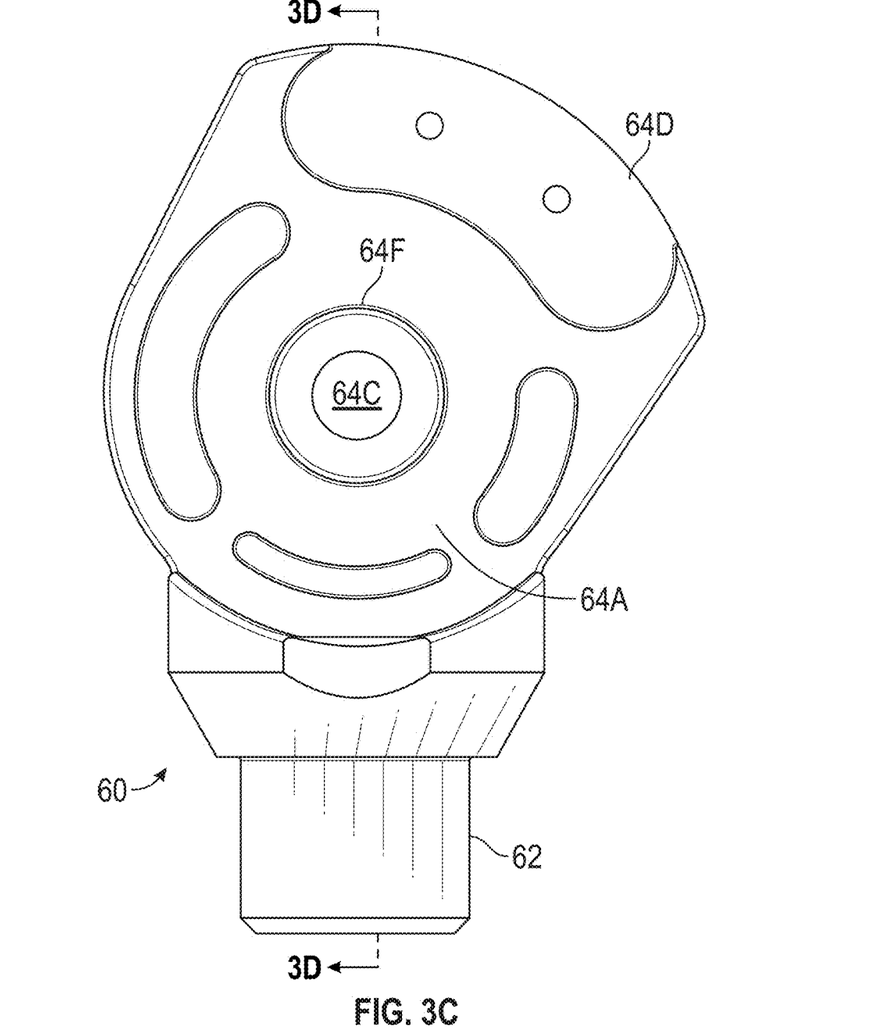
FIG. 3C is a side view of the reel seat structure of FIG. 3A.
Figure 3D:
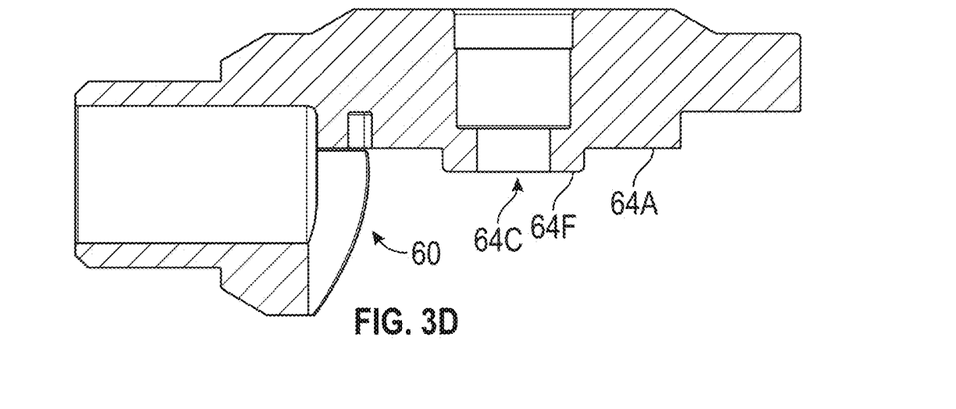
FIG. 3D is a cross-sectional view taken along line 3D-3D of FIG. 3C.

FIGS. 1-7B illustrate an exemplary embodiment 50 of the combination rod butt and reel seat device for a fishing rod which is adjustable between a linear configuration and one or more curved or angled configurations. The exploded view of FIG. 2 illustrates components of the device 50.

In this exemplary embodiment, the device 50 includes a reel seat connector structure 60 with a reel seat connector portion 62, and a butt section structure 70 with a butt connector portion 72. To complete the fishing rod, a butt section 20 is attached or integrated with the butt connector portion 72, and a reel seat structure 30 is connected or integrated with the reel seat connector portion 62, and a rod blank 40 is attached to the forward end of the reel seat structure 30. The reel seat structure 30 omits the reel seat hardware, which may be of a type as shown in U.S. Pat. No. 4,083,141 (the '141 patent) with hoods and threaded locking rings, or other reel attachment structures. The butt section 20 may include a butt section similar to that shown in the '141 patent, or other butt section configurations.

The reel seat connector structure 60 includes a first hinge structure 64. The butt section connector structure 70 includes a second hinge structure 74. The hinge structures are configured to mate together and provide a hinge which is rotatable about hinge axis 56 through a limited range of motion, in this exemplary embodiment about 60 degrees. In other embodiments, the angular range of motion may be different; in an alternate embodiment, the angular range of motions is about 30 degrees. The hinge structures 64 and 74 are assembled together such that respective facing surfaces 64A and 74A are brought together and secured with a threaded fastener 52 and nut 54 passed through openings 64C, 74C formed in the hinge structures 64 and 74. In this exemplary embodiment, a bushing 96 is fitted into a recess 74B in the hinge structure 74.

The hinge structure 64 is illustrated in further detail in FIGS. 3A, 3B, 3C and 3D. The structure 64 includes a boss 64F surrounding the opening 64C and protruding from the surface 64A. The boss is sized to fit into the recess 74B in hinge section 74 (FIG. 4A) when assembled, with the bushing 96 surrounding the boss. The hinge structure 64 further defines an arcuate recess 64D at a distal edge of the structure 64. The recess is sized to accept the receiver structure 90, which is secured in this embodiment by threaded fasteners 94 extending through openings 64E in the recess 64D.

The butt section connector structure 70 is shown in FIGS. 4A-4D, and includes the hinge structure 74 and the hinge lock section 76. The top of the lock section has a tapered recessed channel 76A formed therein, tapering outward from a keyhole portion 76A-1 of the channel. A bore or opening 76A-2 is formed in the keyhole portion, extending vertically downwardly. The main body 102 of the lever 100 is accepted within the recessed channel 76A, and a transverse connector portion 104 extends into the opening 76A-2.

The hinge lock section 76 further includes a relieved channel 76B formed in the side of the lock section. This channel is configured to receive the pawl structure 80 as described more fully below.

In an exemplary embodiment, a receiver structure 90 is mounted in a recess 64D formed in hinge structure 60. As shown in detail in FIGS. 6A and 6B, the receiver structure 90 is an arcuate member having formed therein a plurality of spaced openings or holes 92A, 92B, 92C arranged on an arc concentric with the hinge axis. In this example, the holes 92A and 92C subtend an angle of 60 degrees, while permit rotation of the hinge structure through a range of motion of 60 degrees, with an intermediate position defined by hole 92B. In another embodiment, the receiver structure 90 may be fabricated with only two holes, configured to provide an angular range of motion of 30 degrees. The receiver structure is secured by threaded fasteners 94 secured in threaded bores openings 94A, 94B in the receiver passed through openings 64E in hinge structure 60.

Figure 6A:
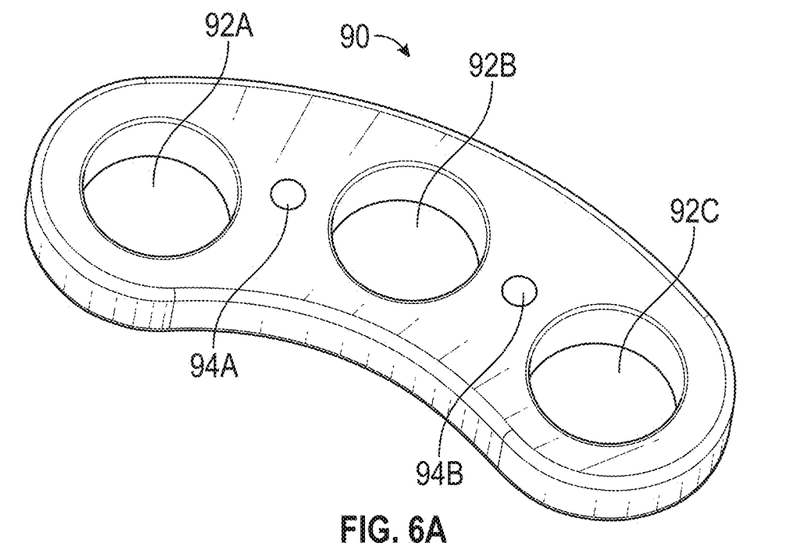
FIG. 6A is an isometric view of a receiver structure for the device of FIG. 1.
Figure 6B:
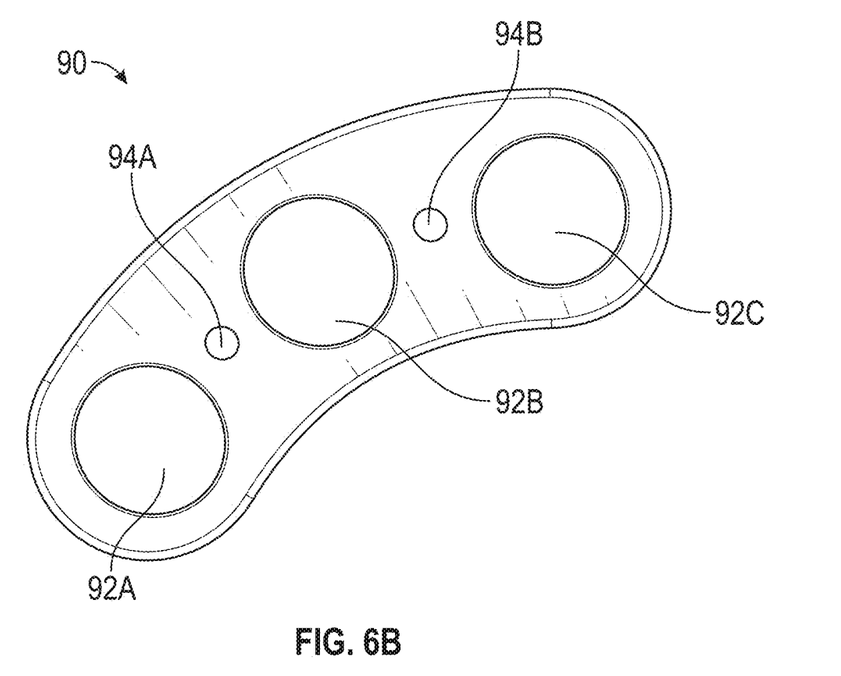
FIG. 6B is a side view of the pawl structure.
Figure 7A:
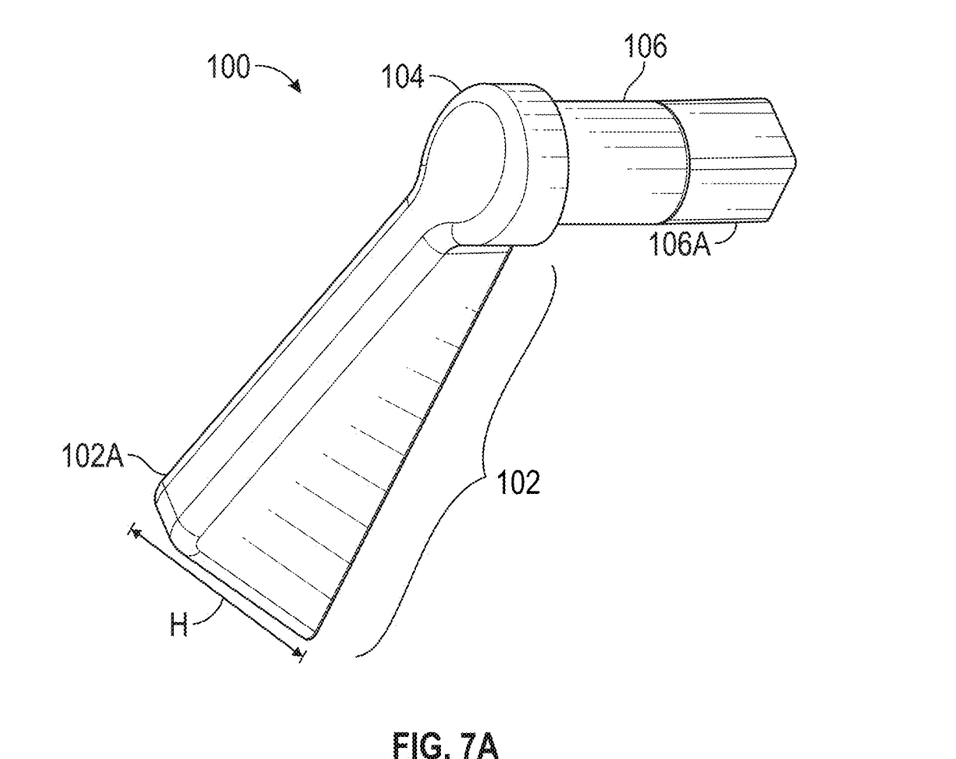
FIG. 7A is an isometric view of an exemplary embodiment of a lever structure for the device of FIG. 1.
Figure 7B:
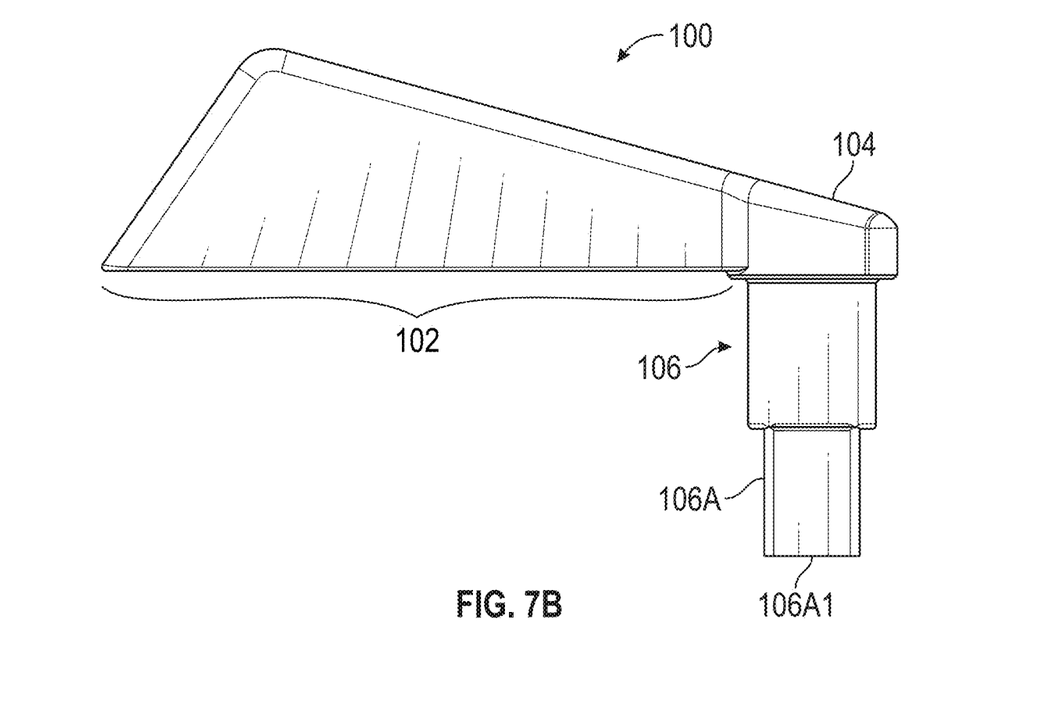
FIG. 7B is a side view of the lever structure.

In this embodiment, the receiver structure is fabricated as a separate structure from the hinge structure 60. This has the advantage of allowing fabrication of the hinge structure 60 from one material such as aluminum and the receiver structure from a different, higher strength material, such as titanium or other high strength material. Alternatively, the receiver structure may be integrally formed with the hinge structure as a one-piece structure, simplifying the fabrication. The material on the one-piece structure preferably is selected to have sufficient strength for use in this application.

A pawl structure 80 (FIGS. 5A and 5B) is configured to fit within channel 76B formed in the hinge lock structure 76 and is mounted for rotational movement on a pawl axis 80A. The pawl structure includes a key opening 82 and a pawl 84 extending from a distal end 80B of the pawl structure. The pawl is arranged to fit into any one of the plurality of openings 92A, 92B, 92C in the receiver 90 to lock the hinge in a corresponding rotational position relative to the hinge axis, with the pawl in a lock position. The pawl structure is fabricated of a high strength material, in an exemplary embodiment, to withstand the forces exerted on the rod and hinge structure during use when a fish is on. In an exemplary embodiment, the pawl structure is fabricated of titanium or other high strength material.

The spring-biased lever member 100 (FIGS. 7A, 7B) is mounted to the hinge lock structure 76 and includes an elongated lever portion 102 and a transverse connector end 106 at an end 104 of the elongated lever portion. The connector end 106 terminates in square key 106A arranged to be received in the key opening 82 of the pawl structure 80. The connector end 106 has a threaded bore formed in the end 106A1, which receives threaded fastener 108 (FIG. 2) passed through hole 76A2, to secure the lever 100 in the channel 76A, while allowing a limited rotation about the threaded fastener.

Figure 4A:
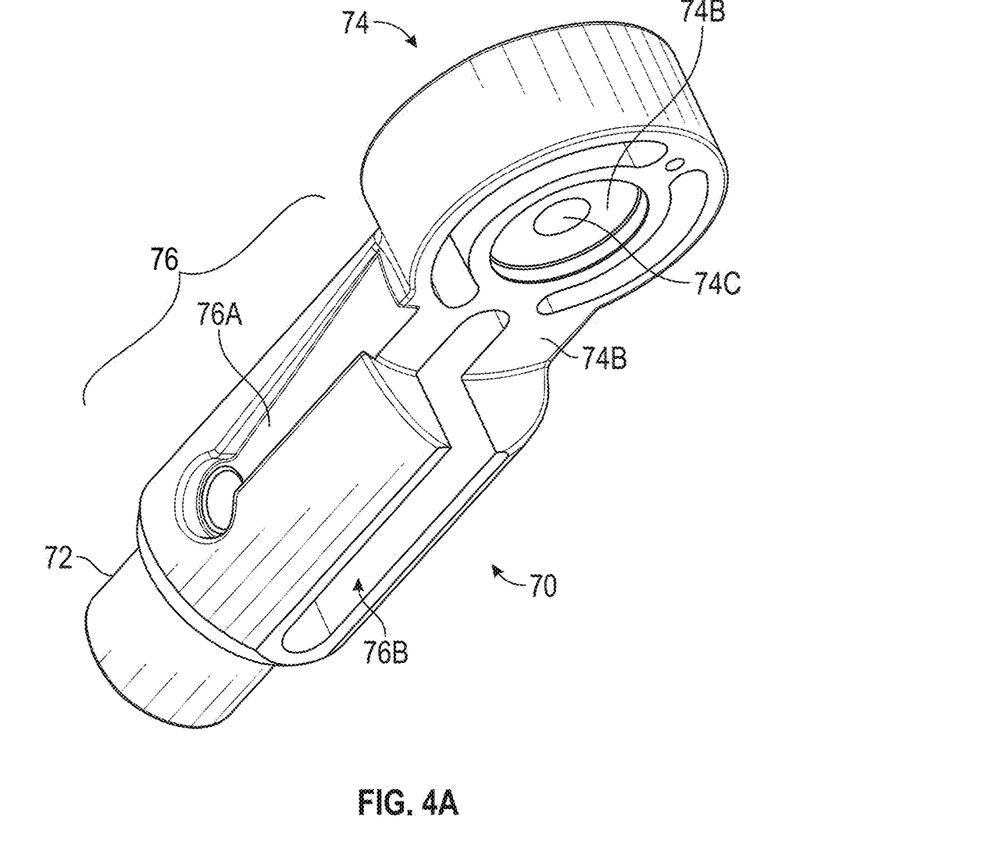
FIG. 4A is an isometric view of an exemplary embodiment of a butt section structure of the device of FIG. 1.
Figure 4B:
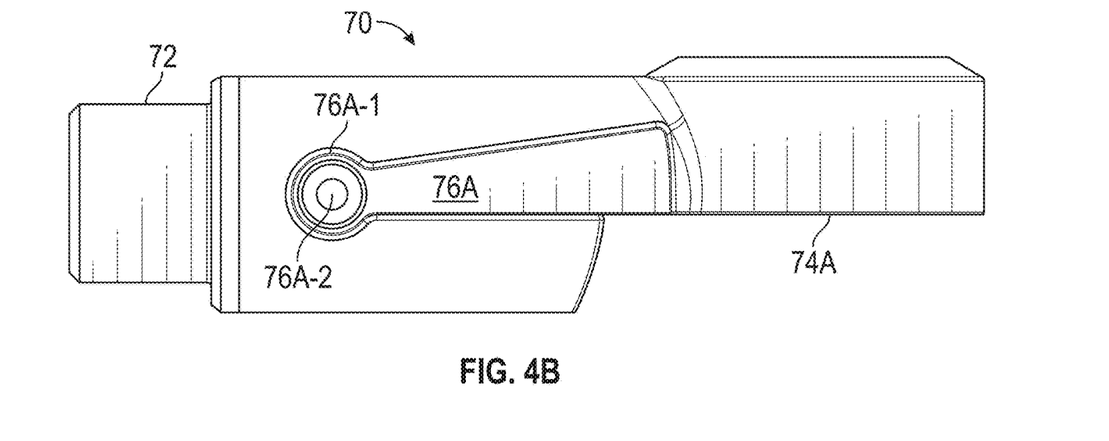
FIG. 4B is a top view of the butt section structure.
Figure 4C:
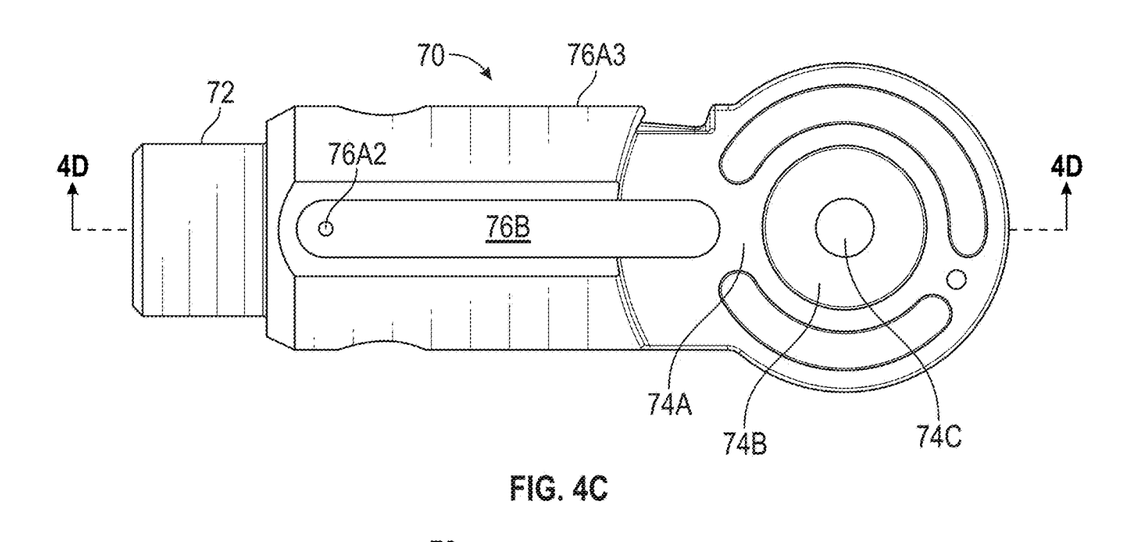
FIG. 4C is a side view of the butt section structure.
Figure 4D:
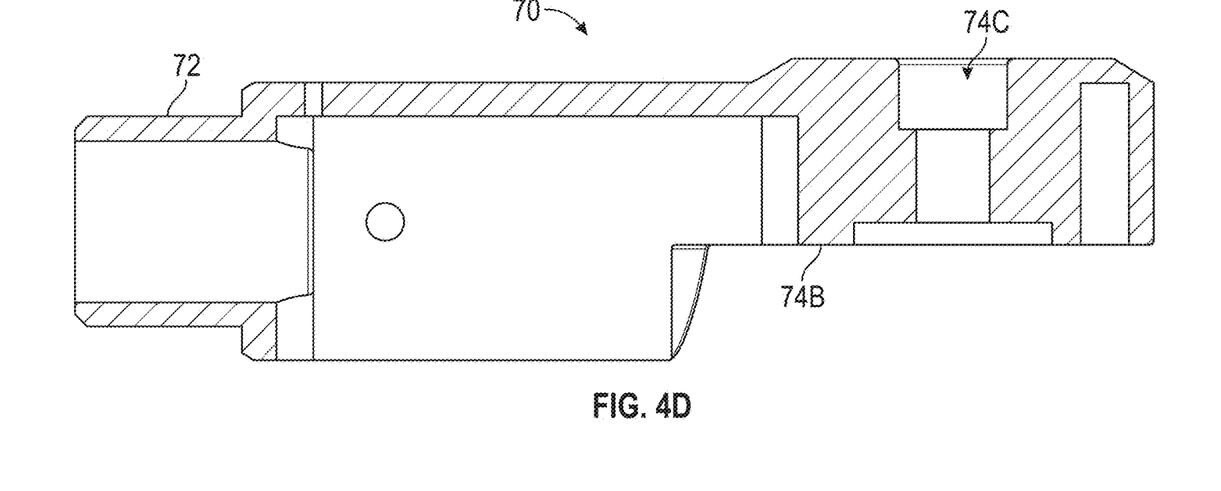
FIG. 4D is a cross-sectional view taken along line 4D-4D of FIG. 4C.
Figure 5A:
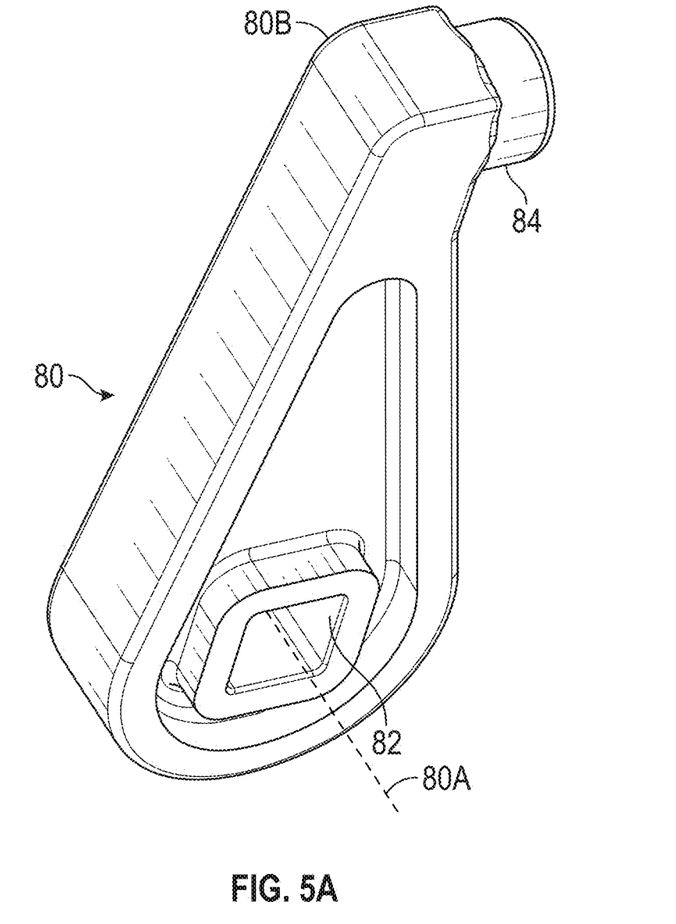
FIG. 5A is an isometric view of an exemplary embodiment of a pawl structure for the device of FIG. 1.
Figure 5B:
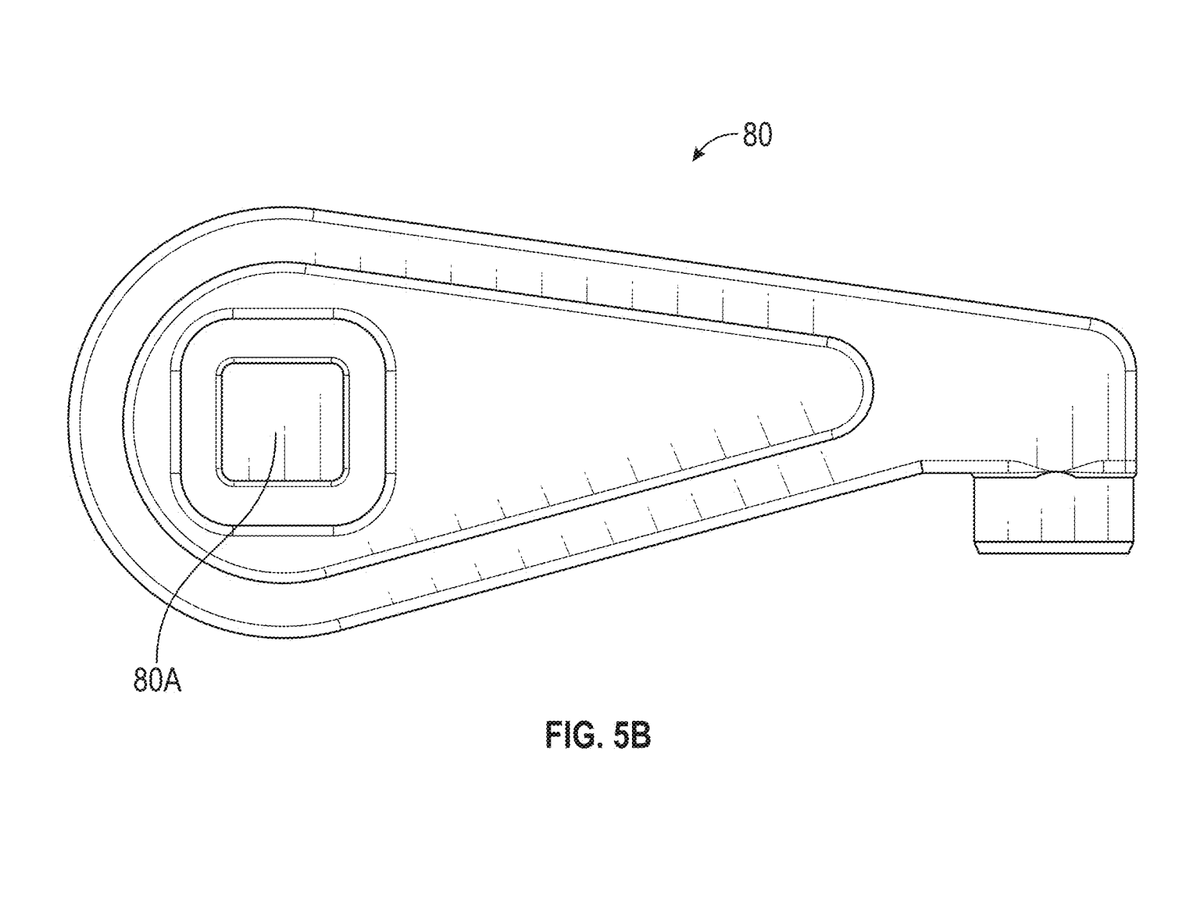
FIG. 5B is a side view of the pawl structure.

The lever member is configured for rotational movement about the transverse connector end 106A and has a home position in which the pawl structure is positioned with the pawl in the selected one 92A of the plurality of openings in the receiver 90, and an unlock position in which the pawl structure is rotated to a position in which the pawl is out of engagement with any of the plurality of openings, allowing rotational movement of the hinge structure. The lever member is biased by a spring member 110 to the home position. The spring member is attached by fastener 110A received in threaded bore 76A2 (FIG. 4C).

The lever member 100 is tapered to have a larger height H at end 102A than at the connector end 104. This height positions the end 102A to be above the surface 76A3 (FIG. 4C) to be readily accessible to the user to manipulate with a finger or thumb.

In this exemplary embodiment, the lever member 100 is positioned at a top surface of the adjustable butt device 50, so that, with the fishing rod in use and held by the user, the lever member is easily accessible to the user's thumb to press the lever to move to the unlock position.

Although the foregoing has been a description and illustration of specific embodiments of the subject matter, various modifications and changes thereto can be made by persons skilled in the art without departing from the scope and spirit of the invention.

The invention claimed is:

1. An adjustable butt and reel seat device for a fishing rod, comprising:
   a butt section comprising a first hinge structure and a rod butt connector structure;
   a reel seat section comprising a second hinge structure and a reel seat connector structure; and
   a lockable hinge configured to allow relative rotation of the butt section and reel seat section with a lock mechanism to lock the butt section and reel seat section in a plurality of positions, the lockable hinge comprising:
   the first and second hinge structures, wherein said hinge structures are configured to fit together such that respective first and second facing surfaces of the hinge structure are in facing relationship;
   a hinge fastener arranged to pass through respective openings formed in the respective first and second hinge structures, defining a hinge axis transverse to the fishing rod length;

a receiver structure defined by or mounted in a selected one of the first hinge structure or the second hinge structure, the receive structure defining a plurality of spaced openings arranged on an arc concentric with the hinge axis;

a pawl structure arranged to fit within a slot formed in the other of said first and second hinge structures and mounted for rotational movement on a pawl axis, the pawl structure including a key opening and a pawl extending at a distal end of the pawl structure, the pawl arranged to fit into any one of the plurality of openings to lock the hinge in a corresponding rotational position relative to the hinge axis;

a spring-biased lever member mounted to said other of said first and second hinge structures, said lever member including an elongated lever and a transverse connector end at an end of the elongated lever and arranged to be received in the key opening of the pawl structure;

wherein the lever member is configured for rotational movement about the transverse connector end and having a home position in which the pawl structure is positioned with the pawl in the selected one of the plurality of openings, and an unlock position in which the pawl structure is rotated to a position in which the pawl is out of engagement with any of the plurality of openings, allowing rotational movement of the hinge structure.

2. The device of claim 1, wherein the selected one of the first hinge structure or the second hinge structure is the first hinge structure, and the other of the first hinge structure or the second hinge structure is the second hinge structure, the receiver structure is defined by or mounted in the first hinge structure and the pawl structure and the lever structure are mounted to or within the second hinge structure.

3. The device of claim 1, further comprising:
a reel seat structure attached to the reel seat connector; and a rod butt section attached to the rod butt connector structure.

4. The device of claim 1, wherein the lever structure is configured for rotation through a range of motion about a lever axis transverse to a rod axis.

5. The device of claim 1, wherein the receiver structure is a separate structure from the selected one of the first hinge structure or the second hinge structure, and wherein the receiver structure is fabricated of a high strength material sufficient to withstand forces applied in use of the fishing rod.

6. The device of claim 1, wherein the pawl structure is fabricated of a high strength material sufficient to withstand forces applied in use of the fishing rod.

7. An adjustable butt and reel seat device for a fishing rod, comprising:
a butt section comprising a first hinge structure and a rod butt connector structure, the first hinge structure including a hinge lock section;
a reel seat section comprising a second hinge structure and a reel seat connector structure; and
a lockable hinge configured to allow relative rotation of the butt section and reel seat section with a lock mechanism to lock the butt section and reel seat section in a plurality of positions, the lockable hinge comprising:
the first and second hinge structures, wherein said hinge structures are configured to fit together such that respective first and second facing surfaces of the hinge structure are in facing relationship;
a hinge fastener arranged to pass through respective openings formed in the respective first and second hinge structures, defining a hinge axis transverse to the fishing rod;
a receiver structure defined by or mounted in the second hinge structure, the receiver structure defining a plurality of spaced openings arranged on an arc concentric with the hinge axis;
a pawl structure arranged to fit within a slot formed in the hinge lock section and mounted for rotational movement on a pawl axis, the pawl structure including an opening on the pawl axis and a pawl extending at a distal end of the pawl structure, the pawl arranged to fit into any one of the plurality of openings to lock the hinge in a corresponding rotational position relative to the hinge axis;
a lever member mounted to the hinge lock section, said lever member including an elongated lever portion and a transverse connector end at an end of the elongated lever portion and arranged connection to the pawl structure;
wherein the lever member is configured for rotational movement about the transverse connector end and having a home position in which the pawl structure is positioned with the pawl in the selected one of the plurality of openings, and an unlock position in which the lever member rotates the pawl structure to a position in which the pawl is out of engagement with any of the plurality of openings, allowing rotational movement of the hinge structure through a range of motion.

8. The device of claim 7, further comprising a bias member configured to bias the lever member to the home position.

9. The device of claim 7, wherein the opening on the pawl axis is configured to mate with the connector end of the lever member so that the pawl structure is rotationally fixed to the connector end.

10. The device of claim 9, wherein the opening has a rectangular opening configuration, and the connector end has a rectangular configuration configured to fit within the rectangular opening configuration of the opening.

11. The device of claim 7, further comprising a threaded fastener arranged in an opening in the lock section to engage a threaded opening in the connector end of the lever member to hold the lever member in the lock section.

12. The device of claim 7, further comprising:
a reel seat structure attached to the reel seat connector; and a rod butt section attached to the rod butt connector structure; and a rod blank attached to a blank connector of the reel seat structure.

13. The device of claim 7, wherein the lever structure is configured for rotation through a range of motion about a lever axis transverse to a rod axis.

14. The device of claim 13, wherein the range of motion is about 60 degrees.

15. The device of claim 7, wherein the receiver structure is a separate structure from the second hinge structure, and wherein the receiver structure is fabricated of a high strength material sufficient to withstand forces applied in use of the fishing rod.

16. The device of claim 7, wherein the pawl structure is fabricated of a high strength material sufficient to withstand forces applied in use of the fishing rod.

* * * * *